UNITED STATES PATENT OFFICE.

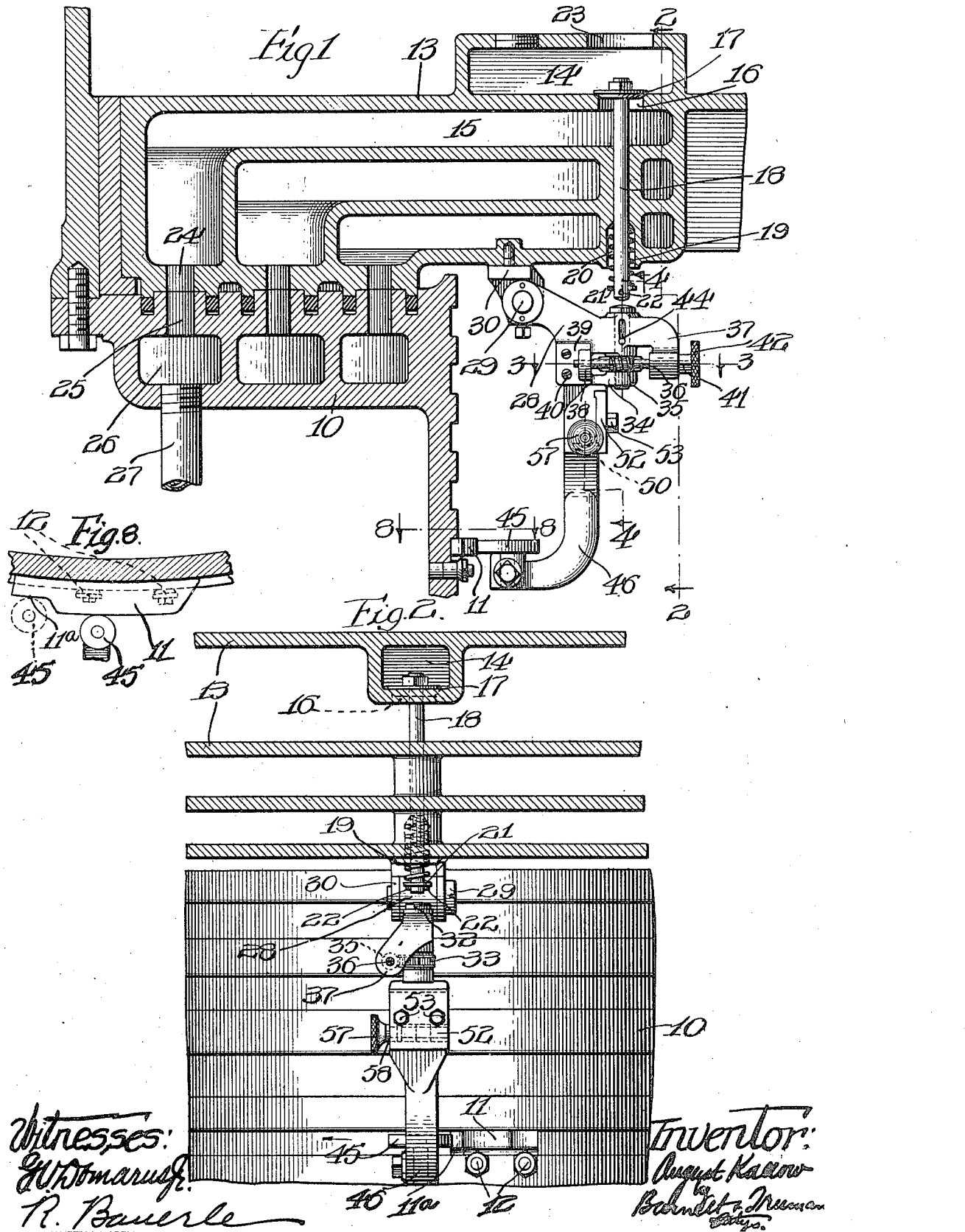

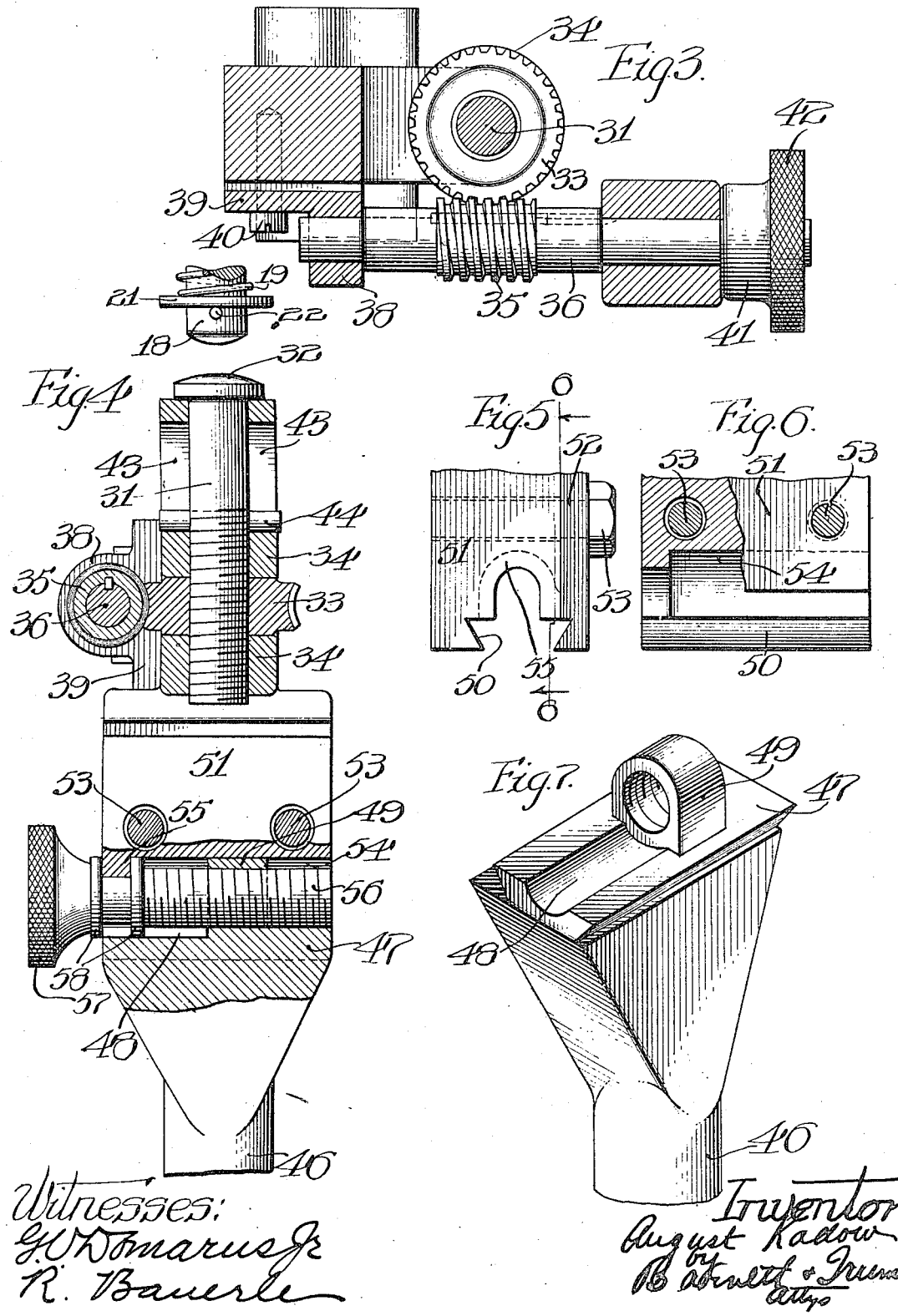

AUGUST KADOW, OF TOLEDO, OHIO, ASSIGNOR TO THE WESTLAKE MACHINE COMPANY, OF TOLEDO, OHIO, A CORPORATION OF OHIO.

AUTOMATIC VALVE MECHANISM.

1,205,354.  Specification of Letters Patent.  Patented Nov. 21, 1916.

Application filed September 11, 1912. Serial No. 719,867.

*To all whom it may concern:*

Be it known that I, AUGUST KADOW, a citizen of the United States, residing at Toledo, in the county of Lucas and State of Ohio, have invented certain new and useful Improvements in Automatic Valve Mechanism, of which the following is a specification.

My invention relates to automatic valve mechanism, and the invention has for one of its objects to provide a simple and readily manipulated device for adjusting the valve actuating mechanism with respect to the valve so as, for example, to accommodate the mechanism to wear in the valve disk or other parts of the apparatus.

A further object is to provide, in apparatus in which a valve is periodically opened by means of a cam, an actuating element interposed between the cam and the valve which can be set or adjusted to vary the moment at which the valve is opened without making any change in the relative position of the cam to the valve.

A more specific object of the invention is to make an improvement especially in the respects above noted, upon the operating mechanism for the vacuum valve forming a part of the machine for working glass shown and described in my copending application Serial No. 570,621, filed July 6, 1910.

In the machine described in this application the glass is withdrawn from the glass furnace in measured charges by means of certain vacuum-operated gathering mechanisms. At the proper moments a vacuum is created in what is termed the blank mold. This blank mold is formed with an inlet port which is brought into contact with the molten glass in the glass furnace. The vacuum sucks up glass into the mold. The vacuum valve referred to is the valve for putting the gathering or blank mold in communication with the exhausting apparatus. In the operation of the machine as originally constructed some difficulty was experienced due to the fact that the mechanism used for opening and closing the vacuum valve could not be adjusted with the nicety and convenience required by the conditions under which the machine was used. The glass operated upon is not always uniform in character. The constituents may vary to a certain degree. The temperature at which it is worked may also vary. If the suction produced in the blank mold is too strong relative to the character and consistency of the particular run of glass being worked the blank will be overcooled. It is therefore necessary to vary the effective size of the port through which the air is exhausted in accordance with the character of the glass operated upon, and as this can only be determined by actual operation of the machine it is a matter of very great convenience to be able to adjust the degree of exhaustion produced in the blank mold while the machine is in operation. The present invention provides for this adjustability. After the glass has been sucked up into the mold the degree of vacuum maintained back of the blank need not be so great as that required to elevate the metal. Any excess tends to overcool the blank and make it unworkable. The machine described in my application above referred to, as it was originally constructed, failed to give the best results because no provision was made for diminishing the intensity of the vacuum at the time that the blank was held in the mold after the mold had been completely filled and before the delivery of the blank to the spindle. My present invention provides an arrangement for producing, in effect, vacuums of two different intensities, the vacuum of greater intensity serving to draw the metal up into the mold, that of lesser intensity being employed to simply hold the partially congealed mass in the mold until it can be delivered to the spindle.

The invention has for a further object to provide a cam actuated mechanism for periodically opening a valve consisting of the devices, combinations and arrangements shown in the drawings annexed hereto and which will be hereinafter more fully described and claimed.

The invention is illustrated, in a preferred embodiment, in the accompanying drawings, wherein—

Figure 1 is a vertical section taken through the apparatus; Fig. 2, an end elevation; Fig. 3, a sectional plan taken on line 3—3 of Fig. 1; Fig. 4, a sectional view taken on line 4—4 of Fig. 1; Fig. 5, a fragmentary end elevation of a portion of the rocking actuating device; Fig. 6, a side view of the same showing a part in section; Fig. 7, a view, in perspective, of the adjustable element adapted to engage the cam, and Fig. 8, a sectional plan taken on line 8—8 of Fig. 1.

Like characters of reference designate like parts in the several figures of the drawings.

The valve mechanism of the present invention is shown in the drawings and will be described as forming a part of a machine such as that described in my application above referred to, in which a circular element or spider rotates around a stationary drum. The valve and the mechanism for opening the same, the subject matter of the present invention, are carried by the spider. The cam is fixed on the stationary drum. In this case just enough of the construction of the machine has been shown to make clear the operation of the improvement here concerned.

Referring to the drawings, 10 designates the stationary drum and 11 the cam secured to the drum by the bolts 12. The circular revoluble member or spider is designated 13. It is formed with the chambers 14 and 15 communicating by means of a port 16.

17 designates the valve operated by the improved mechanism constituting the invention herein claimed. The valve has a stem 18 and is normally kept seated by a spiral spring 19 seated in a recess 20 in the under side of the spider 13 and bearing against a pin 22 extending through the stem 18. The chamber 14 has a port 23 designed to put the chamber in communication with the space intended to be exhausted when valve 17 is raised. The part of the machine formed with this passageway or space is not shown herein as it forms no part of the present invention. The chamber 15 has a port 24 adapted to communicate with the port 25 of a passageway 26 in the head of drum 10. A pipe 27 leads from the passageway 26 to exhausting apparatus (not shown). The intention is that the valve 17 be raised from its seat at a certain definite moment with relation to the series of operations accomplished by the machine and held open for a definite but brief space of time. That is, the valve is opened each time its actuating mechanism comes into contact with the cam 11 or other similar cams arranged around the periphery of the drum 10. The actuating device consists of a preferably tilting element on which are mounted two adjustable members, one under the stem 18 of the valve and adjustable to and from the stem for the purpose of taking up wear in the valve and stem, the other member being adjustable in a direction at right angles to the first named member and being adapted to contact with the cam 11, the adjustment being for the purpose of accurately timing the lifting of the valve without changing the position of the cam. Both of these adjustments are very desirable, if not necessary, in a machine in which the opening of the valve must be timed with the greatest accuracy. If the valve disk, its stem, or the part which abuts against the stem, or any of them, become appreciably worn the period of time during which the valve stands open and the effective size of the port are changed. As above stated, the effective size of the exhaust port must be varied, so as to vary the vacuum produced in the blank mold, in accordance with the character of the glass being worked. Considerations of like nature may require a variation in the moment that the valve is opened and it is a matter of great convenience to be able to make this adjustment as well as the other while the machine is in operation instead of stopping the machine as would be necessary if the adjustment could be effected only by changing the position of the cam on the drum.

28 designates the rocking element mounted by means of a cross pin 29 on the forked bracket 30 secured to the under side of the spider. Loosely mounted in a bore in the rocking member 28 directly below the stem 18 of the valve is a threaded member 31 having a head 32 adapted to abut against the end of the valve stem 18. The threaded end of this member is engaged by an internally threaded worm wheel 33 arranged in a forked portion 34 of the rocking element 28. The worm wheel 33 is meshed by a worm 35 keyed to a shaft 36 mounted at one end in a depending arm 37 formed on the rocking member 28 and at the other end in a boss 38 on a plate 39 secured to the rocking element by the screws 40. The shaft 36 has a hub 41 bearing against the end of the arm 37 and a knurled head 42. The rocking element is formed with slots 43 to receive the ends of a guide pin 44 on the adjustable member 31. The space between the head 32 and the end of the valve stem 18 can be varied by turning the worm shaft 36.

The cam 11 is engaged by a roller 45 mounted on the end of an arm 46 formed at its upper end with the dove-tailed projection 47 having the smooth groove 48 in its upper surface and formed with the internally threaded boss 49. The projection 47 fits into and slides in a dove-tailed groove 50 formed in a block 51 constituting the lower part of the rocking member 28 and in a plate 52 bolted to the block by the bolts 53. The block 51 is formed above the slot 50 with a longitudinal recess 54 narrowed at one end by the overhanging lip 55. An adjusting screw 56 having the knurled head 57 extends through the threaded opening in the boss 49 and is held from lengthwise movement by means of collars 58 on opposite sides of the lip 55. By turning the adjusting screw 56 the lateral position of the roller 45 may be varied. Hence it is possible to vary the moment at which the valve 17 is opened by cam 11 without making any change in the position of the cam. The cam 11 is reduced at one end as indicated at 11ª. When the roller rides down upon this reduced portion of the cam the valve 17 occupies a position at a very slight distance from its seat. This results in diminishing the vacuum back of the blank, the blank mold having been filled by this time with the molten metal from the furnace. By reducing the strength of the exhaust operating against the glass in the mold the cooling effect upon the blank of the exhausting operation is diminished. The vacuum may be safely reduced at this stage as a less degree of vacuum is required for keeping the partially congealed blank in the mold than was required for sucking up the glass.

While I have described my invention in certain preferred embodiments it will be readily understood that modifications might be made without departure from the invention. Therefore I do not wish to be understood as limiting the invention to the particulars described and shown.

I claim:

1. The combination with a relatively movable cam and valve support, of a valve on said support and transmission mechanism carried by said support and interposed between the valve and the cam comprising an element adjustable with relation to the valve to vary the valve opening, and other elements adjustable to vary the moment of actuation of the cam.

2. The combination with a relatively movable cam and valve support, of a valve on said support and transmission mechanism carried by said support and interposed between the valve and the cam comprising an element adjustable with relation to the valve to vary the valve opening, and other elements adjustable to vary the moment of actuation by the cam, said cam being formed to hold the valve open to different extents in successive stages of operation.

3. In vacuum glass gathering mechanism, the combination with a support, of a vacuum valve carried thereby, valve operating mechanism for said valve, and a cam arranged to actuate said mechanism to periodically hold said valve open to a certain degree, then to hold it open a less degree and then permit it to close.

4. In apparatus of the character described, the combination with a valve and a cam, one having translatory movement with respect to the other, of a rocking device for actuating the valve from said cam, provided with adjustable members for engaging the valve and cam respectively, the device for engaging the valve being normally out of contact therewith and means for varying the positions of said members with respect to said device.

5. In apparatus of the character described, the combination with a reciprocating valve having a stem, of a cam, a rocking device for actuating said valve from said cam, a member mounted on said rocking device so as to be movable in substantial alinement with said valve stem but normally out of contact therewith and having a threaded portion, a worm wheel having a threaded opening through which the threaded portion of said member passes, and a shaft provided with a worm engaging said worm wheel.

6. In apparatus of the character described, the combination with a reciprocating valve having a stem, of a cam, a rocking device for actuating said valve from said cam comprising two elements capable of adjustment laterally, with respect to the axis of said valve, one of which elements engages with the cam and the other element being provided with means normally out of contact with the valve stem but adapted to engage therewith.

7. In apparatus of the character described, the combination with a reciprocating valve having a stem, of a cam, a rocking device for actuating said valve from said cam comprising two elements, one formed with a dovetailed projection and the other with a slot to receive the same whereby one of said elements is capable of adjustment laterally, with respect to the axis of said valve, one of which elements engages with the cam and the other element being provided with means normally out of contact with the valve stem but adapted to engage therewith.

8. In apparatus of the character described, the combination with a reciprocating valve having a stem, of a cam, a rocking device for actuating said valve from said cam comprising two elements capable of adjustment laterally, with respect to the axis of said valve, one of which elements is adapted to engage with said cam, and a member mounted on the other of said elements so as to be normally out of contact with said valve stem and so as to be adjustable in substantial alinement therewith.

9. In apparatus of the character described, the combination with a reciprocating valve having a stem, of a cam, a movable device for actuating said valve from said cam comprising two elements capable of adjustment laterally, with respect to the axis of said valve, one of which elements is adapted to engage with said cam, and a member mounted on the other of said elements so as to be normally out of contact with said valve stem and so as to be adjustable in substantial alinement therewith.

10. In apparatus of the character described, the combination with a reciprocating valve having a stem, of a cam, one being movable with respect to the other, a rocking element arranged adjacent the end of the valve stem provided with a member normally out of contact with said stem but adapted to engage therewith, which member is adjustable to and from the stem, and with an arm adapted to engage said cam which is adjustable in a direction transverse to the direction of adjustment of said valve engaging member.

11. In apparatus of the character described, the combination with a reciprocating valve provided with a stem, of a cam, a rocking device which moves with the valve, a member having a threaded portion arranged on the rocking device in substantial alinement with the end of the valve stem, and normally out of contact therewith, means engaging the threaded portion of said member for adjusting the same to and from said stem, an arm having a slidable engagement with said rocking device in a direction transverse to the axis of said valve provided with a roller to engage said cam, and means for adjusting the position of said arm on said rocking device.

12. In glass forming apparatus comprising a stationary and a movable element, the movable element having an exhaust duct, the combination of a valve to control said duct, mechanism for opening and closing said valve, and an adjustable device, which can be manipulated without stopping the movement of the movable element, for adjusting said valve operating mechanism to vary the effective size of the port controlled thereby.

13. In glass forming apparatus comprising a stationary and a movable element, the movable element having an exhaust duct, the combination of a valve to control said duct, mechanism for opening and closing said valve, and an adjustable device, which can be manipulated without stopping the movement of said movable element, for varying the time at which said valve is opened.

AUGUST KADOW.

Witnesses:
  GEORGE E. DIXON,
  L. F. LUSCOMBE.